United States Patent [19]
Rautio

[11] Patent Number: 5,301,796
[45] Date of Patent: Apr. 12, 1994

[54] CHAIN CONVEYOR

[76] Inventor: Kauko Rautio, Kyttäläntie 1, SF-52700 Mäntyharju, Finland

[21] Appl. No.: 3,339

[22] Filed: Jan. 12, 1993

[30] Foreign Application Priority Data

Jan. 13, 1992 [FI] Finland ................ 920140

[51] Int. Cl.⁵ .................................. B65G 15/10
[52] U.S. Cl. ........................... 198/817; 198/851
[58] Field of Search ........................ 198/817, 851

[56] References Cited

U.S. PATENT DOCUMENTS 2,095,867 10/1937 Hammer ............................ 198/851
4,662,509 5/1987 Kaak .............................. 198/851 X

FOREIGN PATENT DOCUMENTS 445221 11/1912 France .
0192608 8/1989 Japan ............................... 198/817
4-49106 2/1992 Japan ............................... 198/851
1371741 10/1974 United Kingdom .

Primary Examiner—James R. Bidwell
Attorney, Agent, or Firm—Pennie & Edmonds

[57] ABSTRACT

The invention relates to a chain conveyor, for example for conveying sawn wood after a sawing machine, the chain conveyor being made up of two adjacent conveyor chains on top of which the conveyor flights supporting sawn wood are located. The conveyor flight is articulated in such a manner that the width of the entire chain conveyor can be regulated by adjusting the distance between the conveyor chains.

7 Claims, 2 Drawing Sheets

CHAIN CONVEYOR

FIELD OF THE INVENTION

The present invention relates to a chain conveyor, for example, for conveying sawn wood after the sawing machine, the chain conveyor being made up of at least two adjacent conveyor chains on top of which the conveyor flights supporting the sawn wood are located.

BACKGROUND OF THE INVENTION

In prior known devices, the conveyor flights supporting sawn wood are various flat bar steels, having the length of two chains and being fixedly installed transversely on top of the chain so that they extend beyond the chain by as much as the width of the chain. When the chains are positioned adjacently, the flat bar steel is equally much also on top of the second chain. This is a simple structure, but the maximum width of the conveyor is only twice the minimum width. Using a conveyor wider than a bundle of sawn wood, from which conveyor the boards are transferred by means of blades or guides to board conveyors on the sides of the conveyor, sufficient boardejection force cannot be achieved. A subsequent board must push the preceding one, and thus they will fall irregularly onto the side conveyors. The boards will wedge against each other, especially if they are waney.

SUMMARY OF THE INVENTION

The object of the invention is to eliminate the disadvantages described above and to provide a new-type chain conveyor with a regulatable width. The chain conveyor according to the invention is characterized in that the conveyor flight is articulated in such a manner that the width of the entire chain conveyor can always be adjusted to sufficient width by adjusting the distance between the conveyor chains. The system according to the invention separates surface boards from the center yield by dropping them to outside the conveyor while the center yield will continue forward. The boards are supported by pressure against the center yield by the driving wheels until they are entirely outside the sawing machine.

One embodiment of the invention is characterized in that the conveyor flight is articulated at its center in such a manner that it forms a V-angle which is obtuse when the chain conveyor is in a wide position and acute when the chain conveyor is in a narrow position, and that the width of the chain conveyor can thus be regulated steplessly.

Another embodiment of the invention is characterized in that the conveyor chains run in chain guides by which the conveyor width can be regulated. Between the conveyor chains there is further a guide rail or chain supporting the conveyor flights.

A chain conveyor such as this is simple; it is economical to manufacture and reliable in operation.

BRIEF DESCRIPTION OF THE DRAWINGS

The invention is described below with the help of an example, with reference to the accompanying drawing, in which.

DETAILED DESCRIPTION OF THE INVENTION

Figure 1:
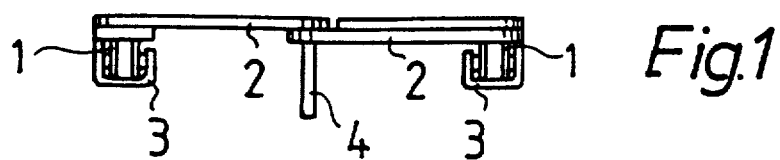
FIGS. 1, 2 and 3 depict end, top and side views of a section of the conveyor chain in a wide position.
Figures 2, 3:
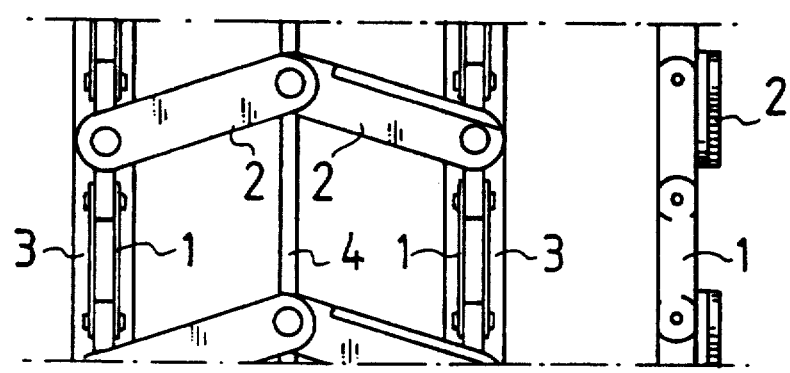
Figure 4:
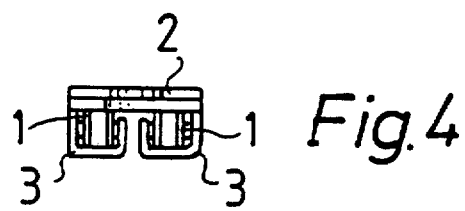
FIGS. 4, 5 and 6 depict the same chain conveyor, but in a narrow position.
Figures 5, 6:
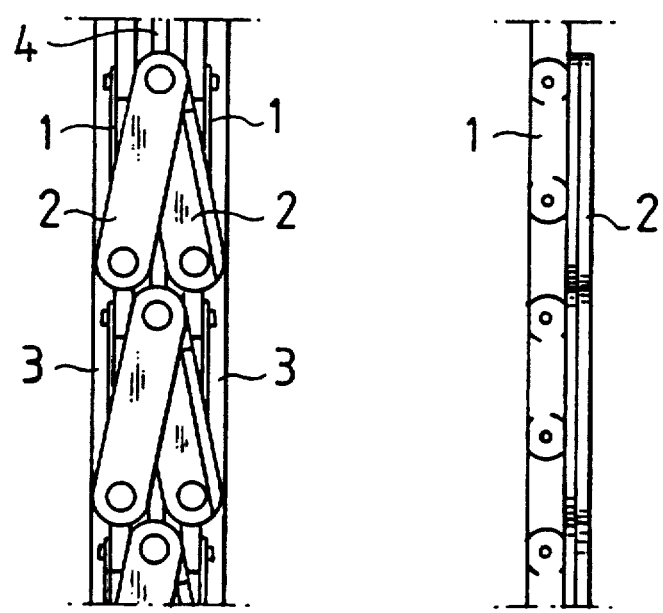
Figure 7:
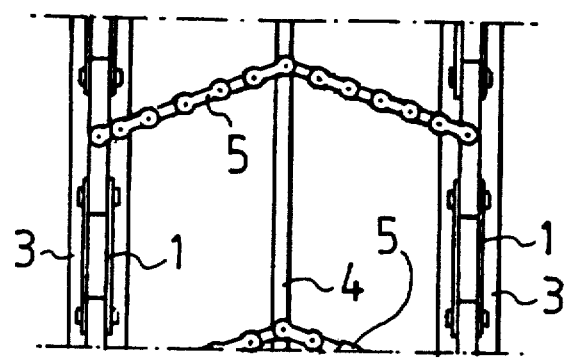
FIGS. 7 and 8 depict top views of alternative conveyor flights, in which they are, according to FIG. 7, a chain 5 and, according to FIG. 8, a belt 6 or a spring steel strip.
Figure 8:
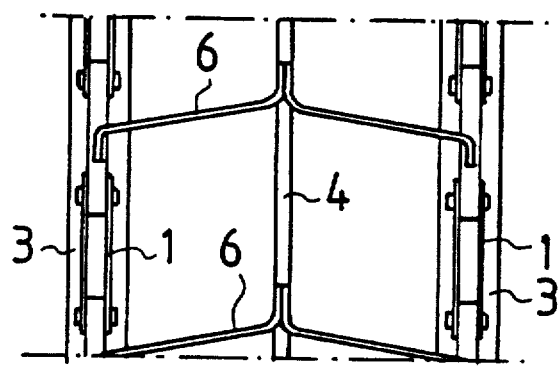

The chain conveyor is made up of two adjacent conveyor chains 1, on top of which the conveyor flights 2 conveying sawn wood are located. The conveyor flights 2 are articulated in such a manner that the width of the entire chain conveyor can be regulated by adjusting the distance between the conveyor chains 1. The conveyor flights 2 are articulated at the center in such a manner that they form a V-angle which is obtuse when the chain conveyor is in a wide position, FIGS. 1–3. The V-angle is acute when the chain conveyor is in a narrow position, FIGS. 4–6. The width of the chain conveyor can thus be adjusted steplessly. The conveyor chains 1 run in chain guides 3, by which the conveyor width can be adjusted. Between the conveyor chains 1 there is a guide rail 4 which supports the conveyor flights 2. Since the motor, power transmission, and width-regulating devices belonging to the chain conveyor are systems and applications known per se, these devices are not described in the present patent application.

I claim:

1. A chain conveyor for conveying sawn wood comprising at least two adjacent conveyor chains spaced apart by a predetermined variable distance and conveyor flights located on top of the chains and including means for supporting sawn wood, wherein the support means of the conveyor flights comprises articulated support surfaces positioned on top of and above the chains and connected in such a manner that the width of the entire chain conveyor can be adjusted to the desired width by adjusting the distance between the conveyor chains.

2. A chain conveyor according to claim 1, wherein the conveyor flight support surfaces are articulated at the center of the conveyor in such a manner that they form a V-angle which is obtuse when the chain conveyor is inn a wide position and acute when the chain conveyor is in a narrow position, wherein the chain conveyor width can thus be adjusted steplessly.

3. A chain conveyor according to claim 1 or 2, wherein the conveyor chains run in chain guides and the width of the conveyor can be adjusted by articulated the conveyor flight support surfaces.

4. A chain conveyor according to claim 1 or 2 which further comprises a guide rail positioned between the conveyor chains and connected to the support surfaces of the conveyor flights.

5. A chain conveyor according to claim 4 wherein the conveyor flights include first and second support surfaces each having a first and second end, with the first ends pivotably connected to the conveyor chains and the second ends pivotably connected to the guide rail and each other to form an articulated joint such that linear movement of the guide rail causes pivotal movement of the support surfaces and a change in the width of the conveyor.

6. A chain conveyor according to claim 5 wherein a plurality of conveyor flights are provided with each flight connected in the same manner so that the angles formed by the support surfaces is the same and is oriented in the same direction for each flight.

7. A chain conveyor according to claim 1 or 2 wherein the support surfaces include a chain a belt or a spring steel strip.

* * * * *